(12) United States Patent
Iyer

(10) Patent No.: US 10,595,510 B2
(45) Date of Patent: Mar. 24, 2020

(54) ANIMAL RESISTANCE TRAINING SYSTEM

(71) Applicant: Ravi Ramamoorthy Iyer, Herndon, VA (US)

(72) Inventor: Ravi Ramamoorthy Iyer, Herndon, VA (US)

( * ) Notice: Subject to any disclaimer, the term of this patent is extended or adjusted under 35 U.S.C. 154(b) by 337 days.

(21) Appl. No.: 15/605,938

(22) Filed: May 25, 2017

(65) Prior Publication Data

US 2018/0338473 A1    Nov. 29, 2018

(51) Int. Cl.
*A01K 15/02*     (2006.01)
*A01K 27/00*     (2006.01)
*A63B 21/065*    (2006.01)

(52) U.S. Cl.
CPC .......... *A01K 15/027* (2013.01); *A01K 27/008* (2013.01); *A63B 21/065* (2013.01)

(58) Field of Classification Search
CPC .... A01K 15/027; A01K 27/008; A01K 27/00; A01K 27/001; A01K 27/005; A63B 21/065; A63B 21/0601; A63B 21/4013; A63B 21/4015; A63B 21/4017; A63B 21/4019; A63B 21/4021; A63B 21/4001
See application file for complete search history.

(56) References Cited

U.S. PATENT DOCUMENTS

| | | | | |
|---|---|---|---|---|
| 4,966,365 A | * | 10/1990 | Winston | A63B 21/065 482/105 |
| 5,076,575 A | * | 12/1991 | Eylander | A63B 21/065 405/186 |
| 5,127,891 A | * | 7/1992 | Winston | A63B 21/065 482/105 |
| 5,667,466 A | * | 9/1997 | Riley, Jr. | A63B 21/065 482/105 |
| 8,617,091 B2 | * | 12/2013 | Brannon | A61D 9/00 119/850 |
| 9,155,286 B2 | * | 10/2015 | Wickens | A01K 15/02 |
| 2003/0177984 A1 | * | 9/2003 | Newman | A01K 13/006 119/850 |
| 2009/0253560 A1 | * | 10/2009 | Cook | A63B 21/065 482/105 |
| 2010/0311551 A1 | * | 12/2010 | Winston | A63B 21/0605 482/105 |
| 2017/0196198 A1 | * | 7/2017 | Scott | A01K 27/001 |

* cited by examiner

*Primary Examiner* — Trinh T Nguyen

(57) ABSTRACT

A weight training apparatus for animals includes a leg strap with a proximal face and distal face, at least one pocket integrated into the leg strap, a first interlocking piece that rests on the proximal face, and a second interlocking piece that rests on the distal face. The first interlocking piece and second interlocking piece are positioned on the opposite ends of the leg strap. The at least one pocket is placed between the first interlocking piece and the second interlocking piece and is capable of holding at least one selected weight from a plurality of weights.

17 Claims, 9 Drawing Sheets

ANIMAL RESISTANCE TRAINING SYSTEM

The current application claims a priority to the U.S. Provisional Patent application Ser. No. 62/341,495 filed on May 25, 2016.

FIELD OF THE INVENTION

The present invention generally relates to a weight training apparatus for animals that utilizes resistance training to improve physical well-being of the animal. In particular, the present invention includes a leg strap fashioned to ergonomically engage the forelegs and hindlegs of an animal and retain one or more weights from a plurality of weights that causes the normal movements of the animal to come under graded resistance.

BACKGROUND OF THE INVENTION

In 2015, Americans spent nearly $60.28 billion on their pets. Of this nearly 40% ($23.05 billion) was spent on food and nearly 50% was spent on supplies and OTC medicine ($14.28 billion) and Vet Care ($15.42 billion) combined. Joint health comprises biggest area of expenditures. Animals are living longer and joint and skeletal ailments continue to be the biggest areas of concern for animal owners. There are three main factors contributing to joint problems:
1) Genetic predisposition to structural unsoundness of joints: Structural problems such as joint dysplasia is a well-recognized problem in pets. While better breeding practices can mitigate this, it is not possible to enforce this. Despite genetics even dysplastic animals can enjoy many years of functional pain free existence if the muscles supporting their dysplastic joints are kept in excellent fitness through regular exercise since these muscles effectively absorb the load and thereby protect the underlying joint.
2) Overweight pets: Pet obesity is a pervasive problem caused by the combination of inadequate resistance exercise and excessive caloric intake.
3) Injury: Joint injury is especially a problem in overweight and under conditioned pets whose muscles are too weak to prevent ligament rupturing stresses from affecting their joints The essential component that protects against joint injury in all animals is the strength and tone of the muscles that operate that joint. The long-term health of joint is therefore favorably impacted by weight loss, appropriate exercise and joint wellness nutritional supplements.

Despite all well-meaning intentions, the vast majority of animal owners are unable to give their animals an adequate exercise. The problem of inadequate exercise directly promotes weight gain and compounds joint injury and damage.

The present invention is a unique innovative solution to the problem that employs low impact resistance loads to normal pet movement that allows the pet to develop the intrinsic small and large muscle stabilizers of shoulder, neck, back and pelvis thereby protecting the joints in these areas from injury and everyday wear and tear.

The present invention is a soft fabric leg strap that allows the present invention to be securely strapped around the forelegs and hind legs of the animal. The animal may wear the present invention for fifteen minutes each day and is allowed to move normally around the house or in the backyard with the present invention engaged. This simple fifteen minute per day of carrying weights on all four limbs, while executing the activities of casual movement in the backyard or in the house, is enough, over an extended period of time, to develop the intrinsic muscle groups required to stabilize and support the joints in the areas of the shoulder, neck, back and pelvis of an animal.

The present invention describes a training system for the attachment of plurality of weights to the limbs of an animal that is secure, comfortable and safe in a manner that does not impede the natural movement of the animal. This allows the normal movements of the animal to come under graded resistance thereby promoting the stepwise development of power in the small and large muscle stabilizers of the joints of the elbows, neck, shoulder, upper and lower back, pelvis, hind limbs of the animal. The present invention can be used on any biped or quadruped animal. The present invention consists of soft, flexible, fabric-based leg strap of dimensions appropriate to the limb of the animal for which it is being used. The leg strap includes at least one pocket that will accommodate at least one selected weight from a plurality of weights in incremental amounts allowing for the graded development of resistance loads for the animal in accordance with a structured resistance training program. The choice of weights will vary depending on the size, species and breed of the animal being considered for resistance training.

The utility of the present invention lies in that a mere fifteen minutes a day is all that is needed, and the animal develops power and muscle tone in all the small and large muscle stabilizers of all critical skeletal areas. The coincident benefit is the automatic loss of weight in the case of overweight animals as the resistance training automatically increases the basal metabolic rate of the animal over time. Thus, the present invention allows the seamless and effortless achievement of multiple health and fitness goals and thus becoming an ideal component of a comprehensive animal wellness program.

DETAILED DESCRIPTION OF THE INVENTION

All illustrations of the drawings are for the purpose of describing selected versions of the present invention and are not intended to limit the scope of the present invention.

Figure 1:
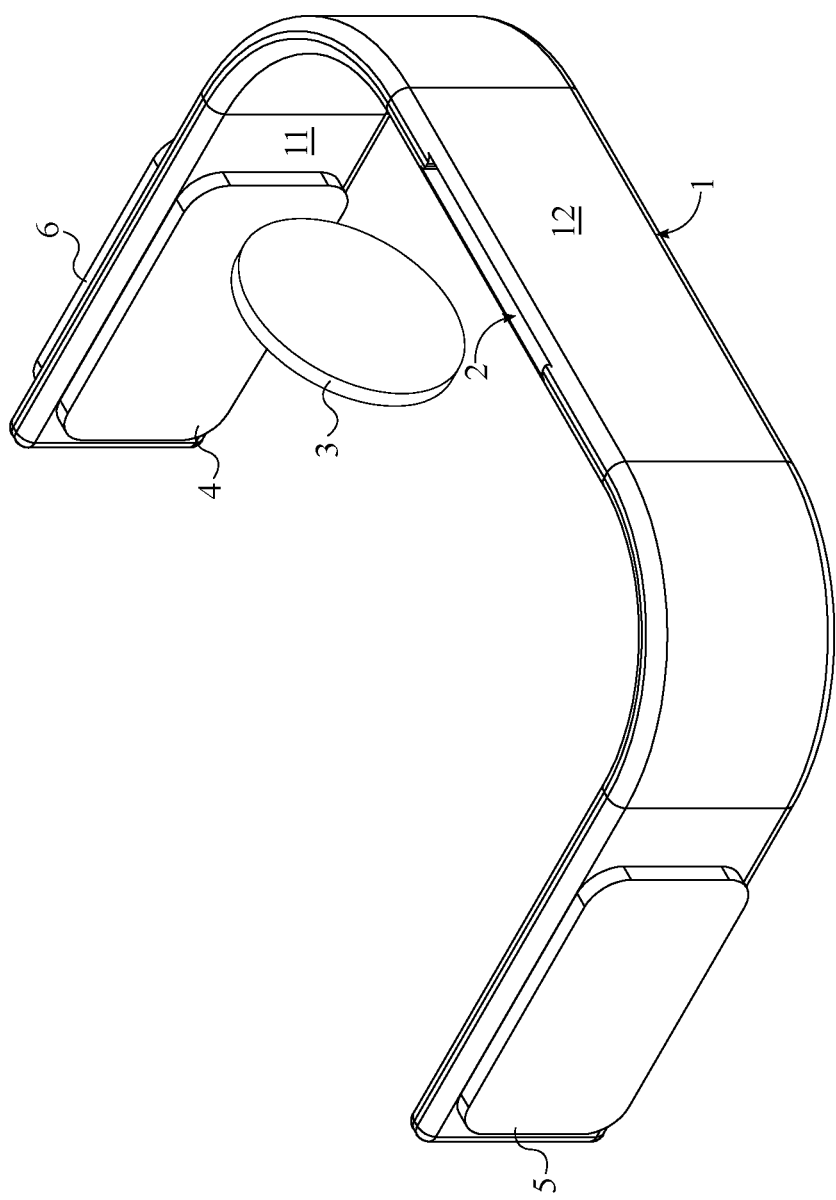
FIG. 1 is a top perspective view of the present invention.
Figure 2:
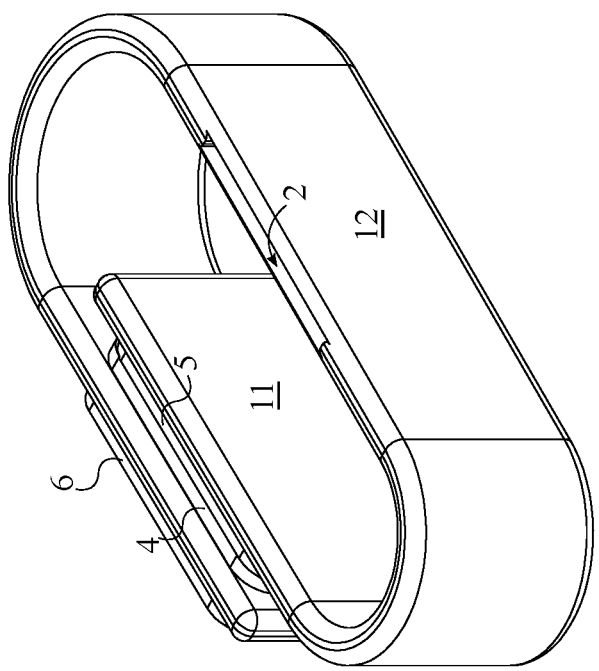
FIG. 2 is a front perspective view of the present invention in the first operative configuration.

The present invention is a weight training apparatus for animals employing a leg strap 1 for loading the front or hind legs of an animal with weights. The preferred embodiment of the present invention as shown in FIG. 1, comprises a leg strap 1, at least one pocket 2, a plurality of weights 3, a first interlocking piece 4, and a second interlocking piece 5. The leg strap 1 allows the present invention to laterally brace a leg of an animal. The leg strap 1 further comprises a proximal face 11 and a distal face 12 located on opposite lateral sides. The at least one pocket 2 is integrated into the leg strap 1 allowing a user to place at least one selected weight from a plurality of weights 3 inside the at least one pocket 2. The first interlocking piece 4 is connected onto the proximal face 11. The second interlocking piece 5 is connected onto the distal face 12. This positions the first interlocking piece 4 and the second interlocking piece 5 opposite to each other along the leg strap 1. In order to engage the present invention to the animal's leg, a user places the leg adjacent to the proximal face 11 and connects the first interlocking piece 4 to the second interlocking piece 5. This secures the leg strap 1 around the leg of the animal. The at least one pocket 2 is positioned between the first interlocking piece 4 and the second interlocking piece 5. Once secured around the animal's leg the distal face 12 is positioned on the outer surface of the leg strap 1 easily accessible to the user. The user can thus easily interact with the at least one pocket 2 which is disposed on the distal face 12. An opening provided on the top of the at least one pocket 2 allows the at least one selected weight to be placed inside the at least one pocket 2. The user may thus increase the load on the animal's leg by adding at least one selected weight inside the at least one pocket 2, or reduce the load by removing the at least one selected weight. In the preferred implementation, the at least one selected weight is placed inside the at least one pocket 2 before wrapping the leg strap 1 around the leg.

In reference to FIG. 1, in some embodiments of the present invention, the at least one pocket 2 is a plurality of pockets. The plurality of pockets is sized and designed to receive the plurality of weights 3 in a manner where the plurality of weights 3 snugly fit within the plurality of pockets which greatly reduces the chances of them falling out. In an alternative embodiment of the present invention, the plurality of pockets may comprise a set of fasteners. The fasteners may be any fasteners, such as button fasteners, to prevent the plurality of weights 3 from falling out of the plurality of pockets. In another embodiment of the present invention, the plurality of pockets may comprise magnet inserts and the plurality of weights 3 must be made of a material which can magnetically couple with the magnet inserts.

Figure 3:
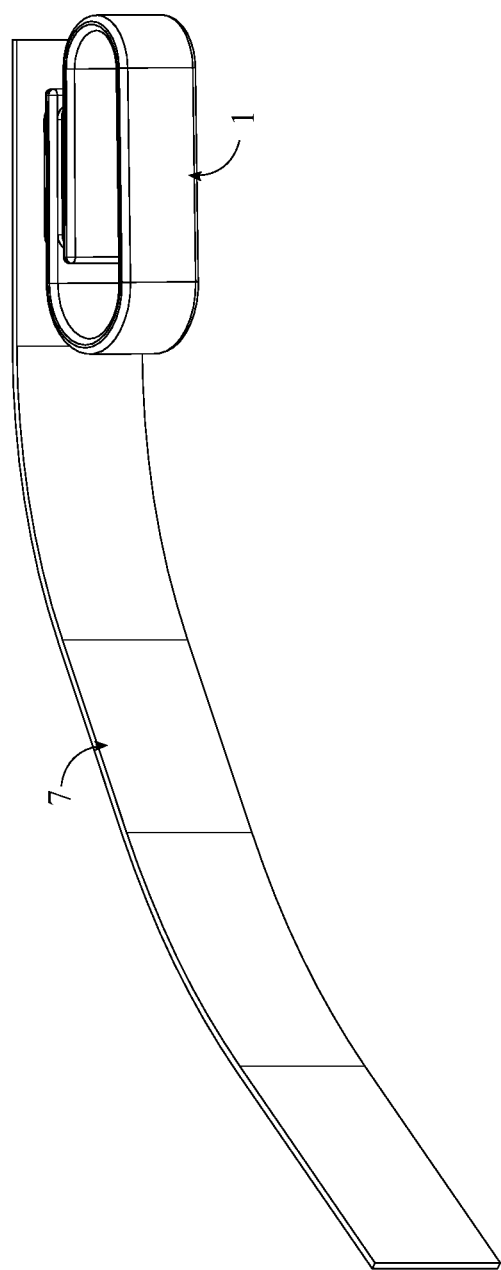
FIG. 3 is a front perspective view of the present invention in the first operative configuration with the extension strap connected to the leg strap.

In reference to FIG. 3, the present invention also comprises an extension strap 7. The extension strap 7 allows the present invention to securely fit around the legs of both large and small animals. The extension strap 7 further comprises a plurality of separable lengthwise pieces 71. Each of the plurality of separable lengthwise pieces 71 is serially connected to each other. Selectively fastening mechanisms, such as hook and loop fasteners, snaps, zippers, and/or the like, are integrated on the lateral walls of the plurality of separable lengthwise pieces 71. This allows the user to increase the effective length of the extension strap 7 by terminally connecting one of the plurality of separable lengthwise pieces 71 to another. A third interlocking piece 6 is connected to the distal face 12 and positioned adjacent to the first interlocking piece 4. The third interlocking piece 6 allows the extension strap 7 to terminally attach to leg strap 1. A user can effectively lengthen or shorten the leg strap 1 by simply adjusting the number of separable lengthwise pieces 71 utilized in the extension strap 7. This may be used to lengthen the leg strap 1 to adjustably fit around the legs of large animals.

Figure 6:
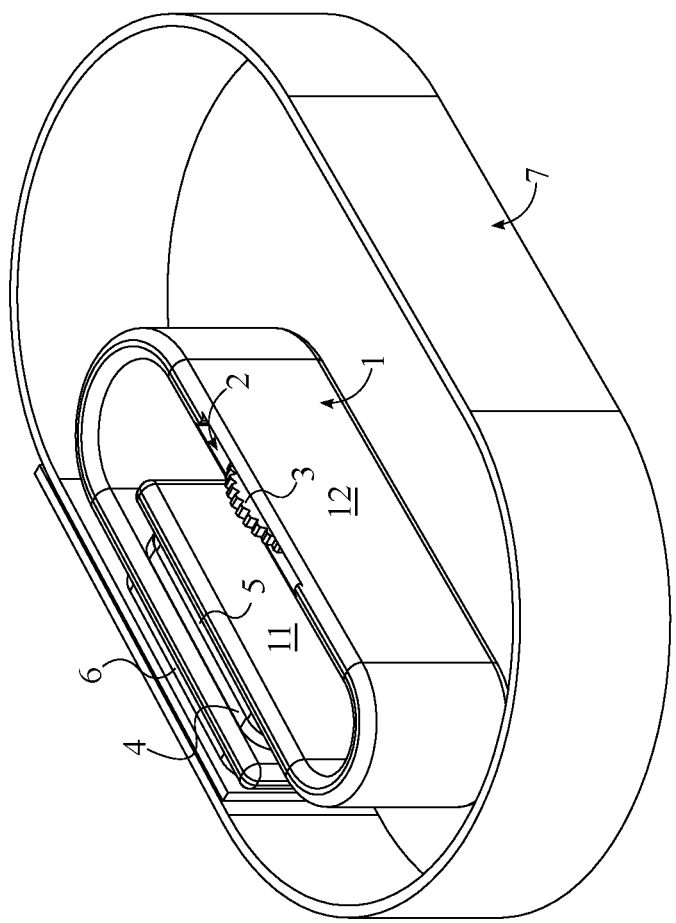
FIG. 6 is a front perspective view of the leg strap and the extension strap in the first operative configuration.
Figure 7:
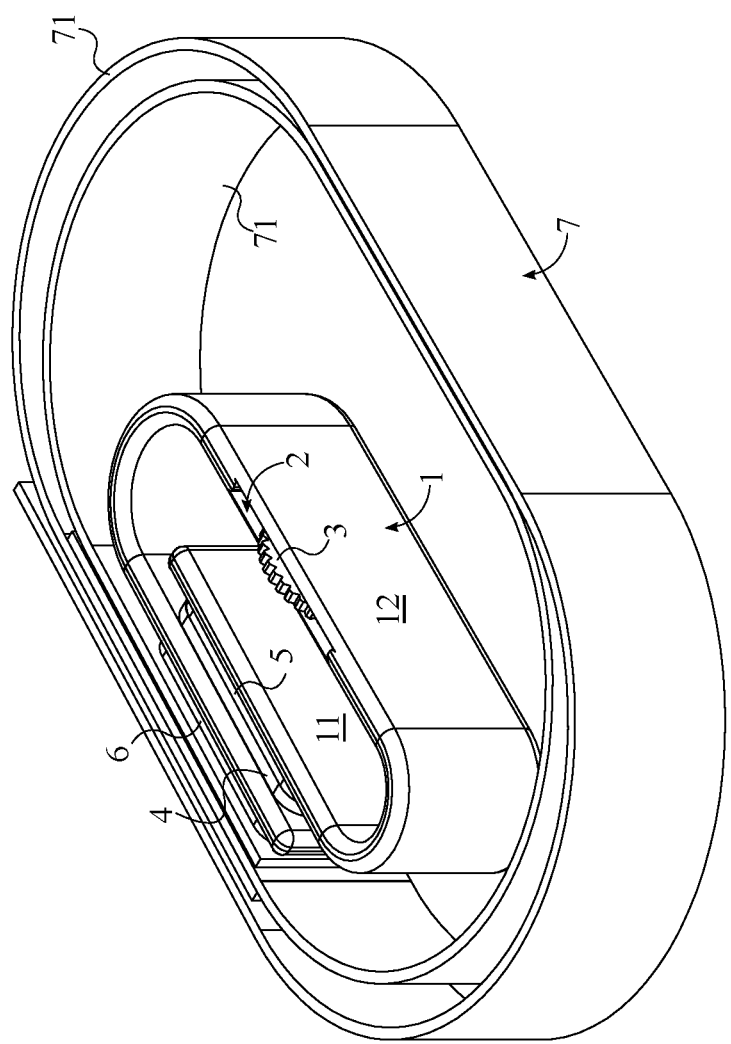
FIG. 7 is a front perspective view of the present invention as shown in FIG. 6 with the extension strap utilizing more than one of the plurality of separable lengthwise pieces.

Referring now to FIG. 6, the leg strap 1, the first interlocking piece 4, and the second interlocking piece 5 of the weight training apparatus can be arranged in a first operative configuration. The first operative configuration secures the leg strap 1 into a closed loop around the stifle of the hind limbs of the animal, and/or on the forelimbs above the pasterns in the case of dogs. For small animals, the closed loop is formed by engaging the first interlocking piece 4 to the second interlocking piece 5. If the animal is small, the animal's leg is completely encompassed by the proximal face 11 of the leg strap 1. As can be seen in FIG. 6 and FIG. 7, in the first operative configuration, the extension strap 7 connects to the third interlocking piece 6 and is wrapped around the leg strap. The extension strap 6 can be used to provide further bracing to leg and secure the at least one selected weight inside the at least one pocket 2. For a large animal with a large diameter leg, the leg strap 1 does not engage the animal's leg and is used only to retain the at least one selected weight. The large animal's leg is instead encompassed by the extension strap 6. The remaining length of the extension strap 7 can be used to secure the opening of the at least one pocket 2, ensuring that the at least one selected weight from the plurality of weights 3 remains attached to the leg strap 1 at all times. The first operative configuration is engaged the leg strap 1 to the animal's leg in a manner that provides a secure and comfortable fit without impeding or interfering with the natural movement of the animal. Alternately, the leg strap 1 can be secured at an appropriate part of the forelimb and hind limb of the animal that is consistent with the anatomy of the specific breed or species of animal.

Figure 4:
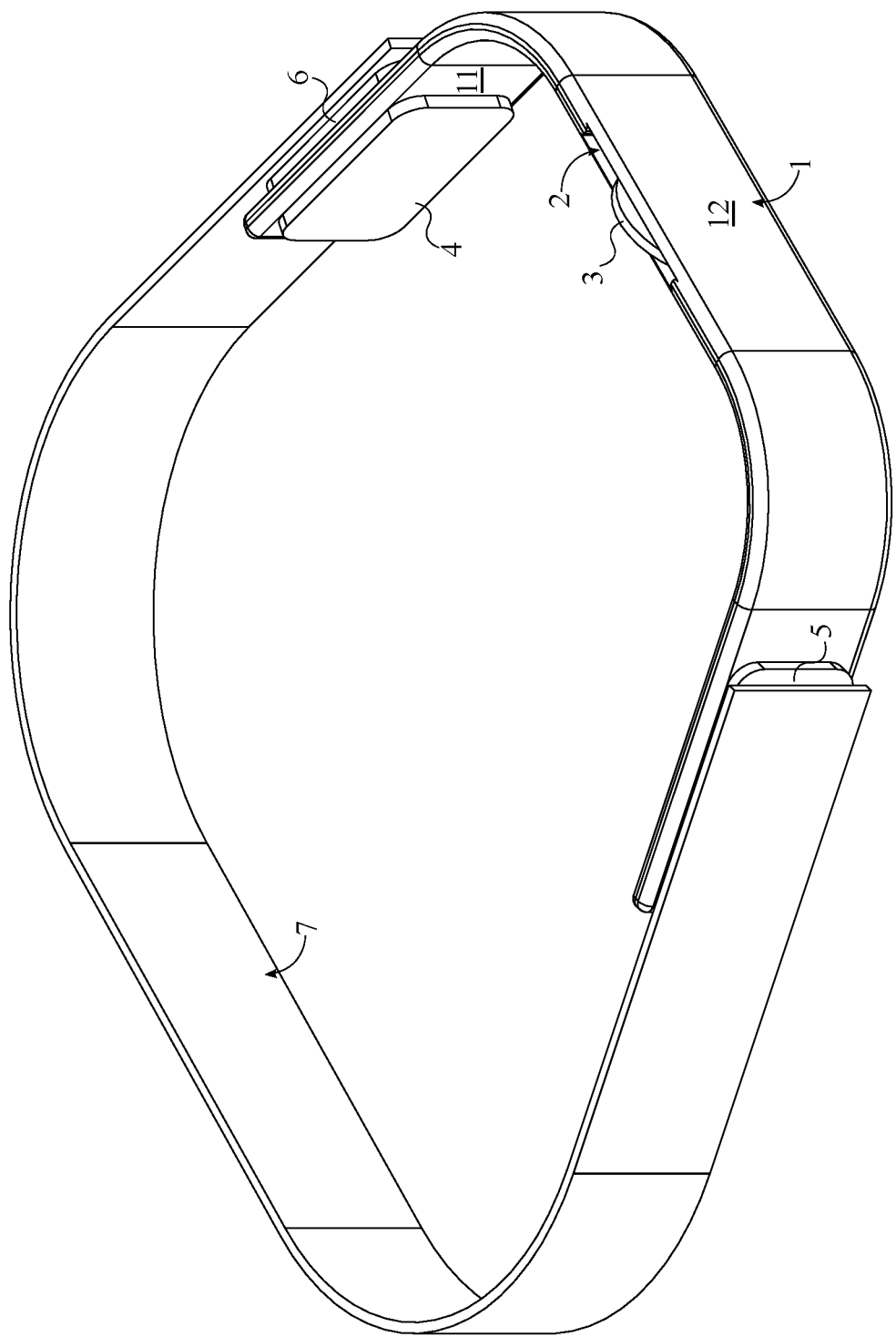
FIG. 4 is a front perspective view of the present invention in the second operative configuration.
Figure 5:
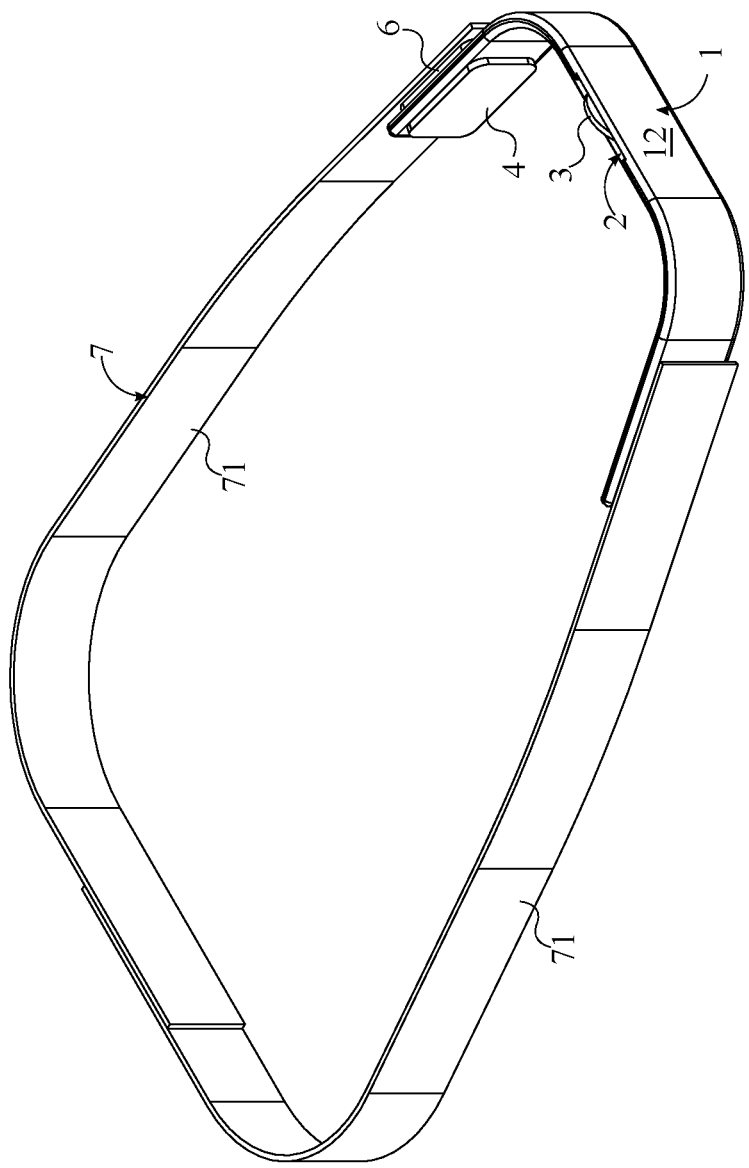
FIG. 5 is a front perspective view of the present invention as shown in FIG. 4 connected to an extension strap utilizing more than one of the plurality of separable lengthwise pieces.

In reference to FIG. 4, the leg strap 1, the first interlocking piece 4, and the second interlocking piece 5 of the weight training apparatus can also be arranged into a second operative configuration. In this configuration, the first end of the extension strap 7 is connected to the second interlocking piece 5 of the leg strap 1. The second end of the extension strap 7 is connected terminally to the third interlocking piece 6 of the leg strap 1. This arranges the leg strap 1 and the extension strap 7 into a closed loop around the leg of a large animal. The animal's leg rests against the proximal face 11 of the leg strap 1 and one of the lateral sides of the extension strap 7. As can be seen in FIG. 5, a user may adjust the diameter of the closed loop by increasing the number of separable lengthwise pieces 71 utilized in the extension strap 7. For example, a small animal, such as cat or small dog, requires a small number of separable lengthwise pieces 71. In contrast, a large number of separable lengthwise pieces 71 are required to securely engage the leg strap 1 around the leg of a large animal such as a horse. If the closed loop formed by the extension strap 7 utilizing just one of the plurality of separable lengthwise pieces 71 is too big to securely engage around the animal's leg, the user can connect the second interlocking piece 5 closer to the first end of the leg strap 1. This reduces the overall diameter of the closed loop and tightens the fit around the animal's leg. In this case, the second end of the extension strap 7 can then connect back onto the first end of the extension strap 7.

Figure 8:
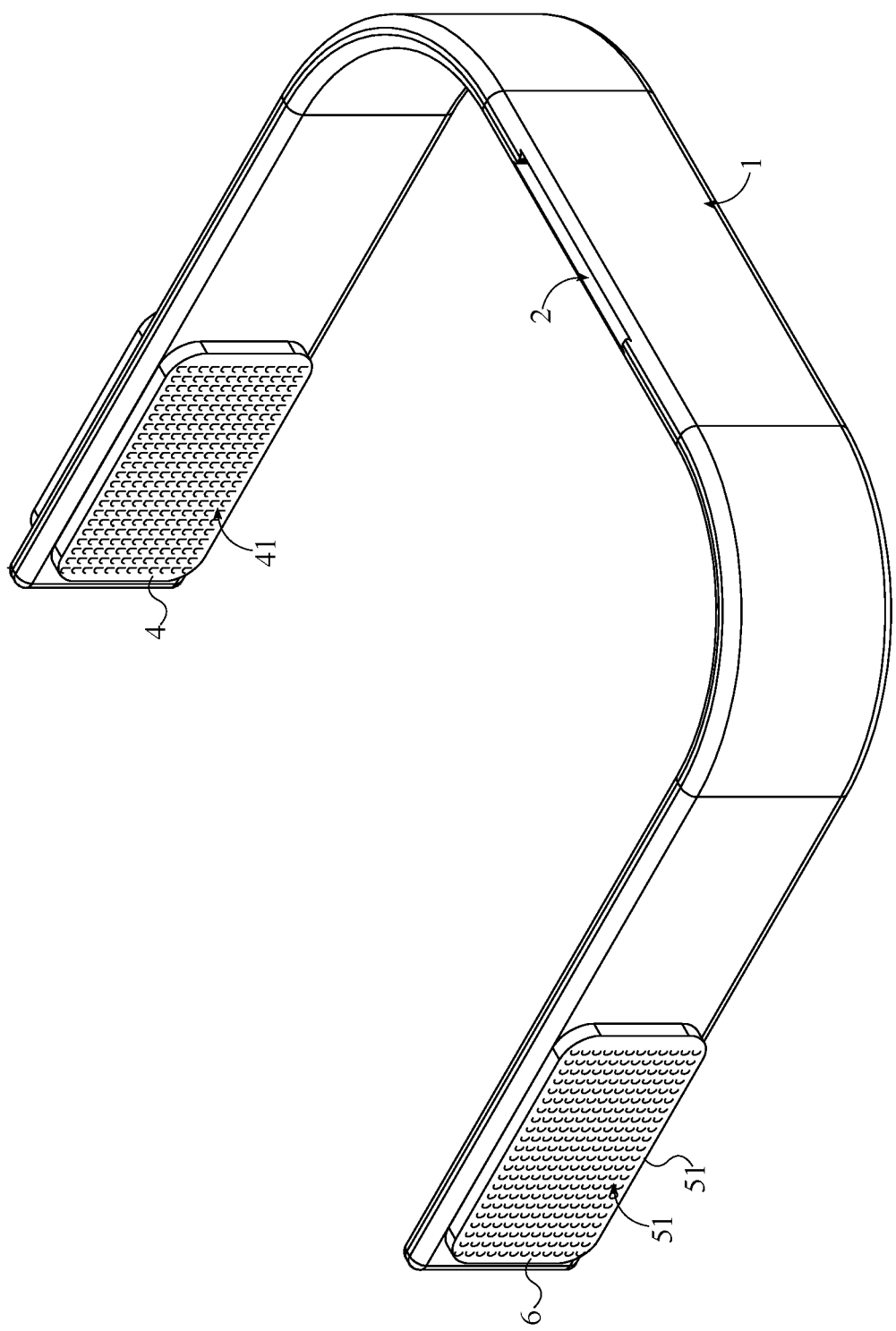
FIG. 8 is front perspective view of the leg strap utilizing a hook-and-loop fastener with the hooks portion on the first interlocking piece and the loops portion on the second interlocking piece.

In reference to FIG. 8, the preferred embodiment of the present invention utilizes a hook and loop fastener. The first interlocking piece 4 is a hooks portion 41 of the hook-and-loop fastener. The second interlocking piece 5 is a loop portion 51 of the hook-and-loop fastener. In this embodiment, the third interlocking piece 6 is another loops portion 61 of the hook-and-loop fastener capable of securely connecting to the second interlocking piece 5.

Figure 9:
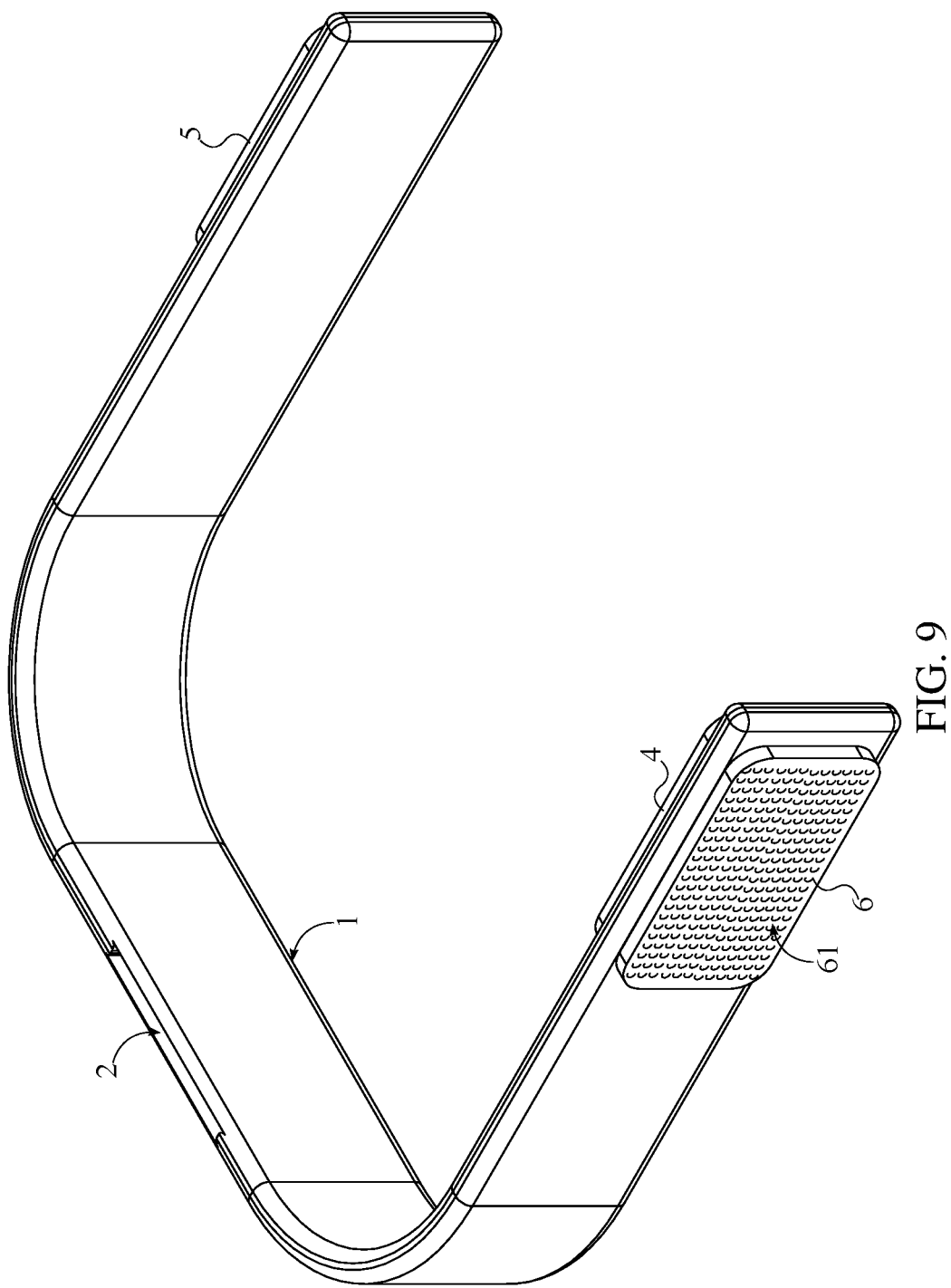
FIG. 9 is a rear perspective view of the leg strap as shown in FIG. 8 showing the loops portion on the third interlocking piece.

In reference to FIG. 9, in other embodiments of the present invention, alternate fastening mechanisms such as eyelets and grommets, zippers, magnets, and the like are utilized. To create an operative connection between the second interlocking piece 5 and the third interlocking piece 6 must comprise a male and female fastener or vice versa. For examples, if the second interlocking piece 5 is connected to an eyelet then the third interlocking piece 6 must be connected to a grommet. If a grommet is connected to the second interlocking piece 5, a grommet must be connected to the third interlocking piece 6. This is true for all fasteners that may be utilized in alternate embodiments.

Referring back to FIG. 8, the preferred embodiment of the leg strap 1 is fabricated out of a heat insulative, soft fabric material, such as cotton or polyester, enabling the present invention to be worn on leg of the animal for a prolonged period of time without causing irritation or discomfort to the animal. The present invention may also comprise a leg strap 1 composed of an elastic material such as synthetic fabric or polymers. This creates an adjustable fit around the leg of the animal without the use of an extension strap 7.

As can be seen in FIG. 1, in the preferred embodiment of the present invention, the plurality of weights 3 may be coin shaped and sized to fit inside of at least one pocket 2 of the leg strap 1. In one possible embodiment of the present invention, the plurality of weights 3 includes a plurality of coins used in monetary exchange such as half-dollars, quarter-dollars, nickels, or pennies. In yet another embodiment of the present invention, the plurality of weights 3 may vary in weight according to the size, breed, and type of animal that the present invention will be used on. Although only a single selected weight from a plurality of weights 3 is placed in the at least one pocket 2, it is possible to insert several selected weights from a plurality of weights 3 in the at least one pocket 2. The number of the plurality of weights 3 inserted in the at least one pocket 2 may vary according to the size, breed, and type of animal and also according to how long the animals has used the present invention. The amount of weight of the plurality of weights 3 also is based upon the weight of the animal in kilograms and is given by the formula of one gram per kilogram of the total body weight of the animal per leg of the animal though the amount of weight of plurality of weights 3 may be any weight. For example, for a 40 kilogram dog the preferred weight would be forty 40 grams weight per leg. Initially only 50% of the allowed weight per leg is inserted then one week after, the weight is increased to 100% of the allowed weight per leg. After six to eight weeks, the weight may be increased to 150% or 200% of the allowed weight per leg.

Although the invention has been explained in relation to its preferred embodiment, it is to be understood that many other possible modifications and variations can be made without departing from the spirit and scope of the invention as hereinafter claimed.

What is claimed is:

1. A weight training apparatus for animals comprises:
   a leg strap;
   at least one pocket;
   a plurality of weights;
   a first interlocking piece;
   a second interlocking piece;
   a third interlocking piece;
   an extension strap;
   the leg strap comprises a proximal face and a distal face;
   the at least one pocket being integrated into the leg strap;
   the first interlocking piece being connected onto the proximal face;
   the second interlocking piece being connected onto the distal face;
   the first interlocking piece and the second interlocking piece being positioned opposite to each other along the leg strap;
   the at least one pocket being positioned in between the first interlocking piece and the second interlocking piece;
   at least one selected weight from the plurality of weights being positioned into the at least one pocket;
   the third interlocking piece being connected onto the distal face; and
   the extension strap being terminally attached to the third interlocking piece.

2. The weight training apparatus for animals as claimed in claim 1 comprises:
   the extension strap comprises a plurality of separable lengthwise pieces;
   the third interlocking piece being positioned adjacent to the first interlocking piece; and
   the plurality of separable lengthwise pieces being serially connected to each other.

3. The weight training apparatus for animals as claimed in claim 1 comprises:
   wherein the leg strap, the first interlocking piece, and the second interlocking piece are in a first operative configuration;
   the leg strap being arranged into a closed loop; and
   the first interlocking piece being engaged to the second interlocking piece.

4. The weight training apparatus for animals as claimed in claim 3 comprises:
   the third interlocking piece being positioned adjacent to the first interlocking piece; and
   the extension strap being wrapped around the leg strap.

5. The weight training apparatus for animals as claimed in claim 1 comprises:
   wherein the leg strap, the first interlocking piece, and the second interlocking piece are in a second operative configuration;
   the third interlocking piece being positioned adjacent to the first interlocking piece;
   the leg strap and the extension strap being arranged into a closed loop; and
   the extension strap being terminally attached to the second interlocking piece, offset from the third interlocking piece.

6. The weight training apparatus for animals as claimed in claim 1 comprises:
   a hook-and-loop fastener;
   the first interlocking piece being a hooks portion of the hook-and-loop fastener; and
   the second interlocking piece being a loops portion of the hook-and-loop fastener.

7. The weight training apparatus for animals as claimed in claim 6 comprises:
   the third interlocking piece being positioned adjacent to the first interlocking piece; and
   the third interlocking piece being another loops portion of the hook-and-loop fastener.

8. The weight training apparatus for animals as claimed in claim 1, wherein the weighted leg strap is fabricated out of a heat insulative, soft fabric material.

9. The weight training apparatus for animals as claimed in claim 1, wherein the weighted leg strap is fabricated out of an elastic material.

10. The weight training apparatus for animals as claimed in claim 1, wherein the plurality of weights includes a plurality of coins used in monetary exchange.

11. A weight training apparatus for animals comprises:
a leg strap;
at least one pocket;
a plurality of weights;
a first interlocking piece;
a second interlocking piece;
a third interlocking piece;
an extension strap;
the leg strap comprises a proximal face and a distal face;
the at least one pocket being integrated into the leg strap;
the first interlocking piece being connected onto the proximal face;
the second interlocking piece being connected onto the distal face;
the first interlocking piece and the second interlocking piece being positioned opposite to each other along the leg strap;
the at least one pocket being positioned in between the first interlocking piece and the second interlocking piece;
at least one selected weight from the plurality of weights being positioned into the at least one pocket;
the third interlocking piece being positioned adjacent to the first interlocking piece;
the third interlocking piece being connected onto the distal face;
the extension strap being terminally attached to the third interlocking piece; and
the extension strap comprises a plurality of separable lengthwise pieces.

12. The weight training apparatus for animals as claimed in claim 11 comprises:
the extension strap being wrapped around the leg strap.

13. The weight training apparatus for animals as claimed in claim 11 comprises:
wherein the leg strap, the first interlocking piece, and the second interlocking piece are in a second operative configuration;
the leg strap and the extension strap being arranged into a closed loop; and
the extension strap being terminally attached to the second interlocking piece, offset from the third interlocking piece.

14. The weight training apparatus for animals as claimed in claim 11 comprises:
a hook-and-loop fastener;
the first interlocking piece being a hooks portion of the hook-and-loop fastener;
the second interlocking piece being a loops portion of the hook-and-loop fastener; and
the third interlocking piece being another loops portion of the hook-and-loop fastener.

15. The weight training apparatus for animals as claimed in claim 11, wherein
the weighted leg strap is fabricated out of a heat insulative, soft fabric material.

16. The weight training apparatus for animals as claimed in claim 11, wherein
the weighted leg strap is fabricated out of an elastic material.

17. The weight training apparatus for animals as claimed in claim 11, wherein
the plurality of weights includes a plurality of coins used in monetary exchange.

* * * * *